US010815328B2

(12) United States Patent
Yan et al.

(10) Patent No.: US 10,815,328 B2
(45) Date of Patent: Oct. 27, 2020

(54) FUNCTIONAL INITIATOR FOR ANIONIC POLYMERIZATION

(71) Applicant: Bridgestone Corporation, Chuo-ku (JP)

(72) Inventors: Yuan-Yong Yan, Copley, OH (US); David M. Roggeman, North Royalton, OH (US)

(73) Assignee: Bridgestone Corporation, Chuo-ku (JP)

( * ) Notice: Subject to any disclaimer, the term of this patent is extended or adjusted under 35 U.S.C. 154(b) by 156 days.

(21) Appl. No.: 15/776,550

(22) PCT Filed: Oct. 8, 2016

(86) PCT No.: PCT/US2016/056200
§ 371 (c)(1),
(2) Date: May 16, 2018

(87) PCT Pub. No.: WO2017/087087
PCT Pub. Date: May 26, 2017

(65) Prior Publication Data
US 2018/0346631 A1  Dec. 6, 2018

Related U.S. Application Data

(60) Provisional application No. 62/255,612, filed on Nov. 16, 2015.

(51) Int. Cl.
| C08F 4/46 | (2006.01) |
| C08F 4/58 | (2006.01) |
| C08F 236/06 | (2006.01) |
| C08F 236/10 | (2006.01) |
| C08K 3/04 | (2006.01) |
| C08K 3/36 | (2006.01) |
| B60C 1/00 | (2006.01) |
| C08K 5/09 | (2006.01) |
| C08L 7/00 | (2006.01) |
| C08K 3/06 | (2006.01) |
| C08K 3/22 | (2006.01) |
| C08K 5/18 | (2006.01) |
| C08L 9/00 | (2006.01) |
| C08L 91/06 | (2006.01) |
| C08L 91/00 | (2006.01) |
| C08K 5/47 | (2006.01) |
| C08K 5/31 | (2006.01) |
| C08K 5/50 | (2006.01) |
| C08K 5/54 | (2006.01) |
| C08K 5/57 | (2006.01) |
| C08L 9/06 | (2006.01) |
| C08F 4/48 | (2006.01) |

(52) U.S. Cl.
CPC .......... *C08F 236/10* (2013.01); *B60C 1/0016* (2013.01); *C08K 3/04* (2013.01); *C08K 3/06* (2013.01); *C08K 3/22* (2013.01); *C08K 3/36* (2013.01); *C08K 5/09* (2013.01); *C08K 5/18* (2013.01); *C08K 5/31* (2013.01); *C08K 5/47* (2013.01); *C08K 5/50* (2013.01); *C08K 5/5403* (2013.01); *C08K 5/57* (2013.01); *C08L 7/00* (2013.01); *C08L 9/00* (2013.01); *C08L 9/06* (2013.01); *C08L 91/00* (2013.01); *C08L 91/06* (2013.01); *C08F 4/46* (2013.01); *C08F 4/463* (2013.01); *C08F 4/48* (2013.01); *C08F 4/58* (2013.01); *C08F 2438/00* (2013.01)

(58) Field of Classification Search
None
See application file for complete search history.

(56) References Cited

U.S. PATENT DOCUMENTS

| 5,416,168 | A | 5/1995 | Willis et al. |
| 5,491,230 | A | 2/1996 | Lawson et al. |
| 5,500,447 | A | 3/1996 | Lawson et al. |
| 5,502,130 | A | 3/1996 | Lawson et al. |
| 5,521,309 | A | 5/1996 | Antkowiak et al. |
| 5,610,228 | A | 3/1997 | Lawson et al. |
| 6,150,487 | A | 11/2000 | Zhang et al. |
| 6,720,391 | B2 | 4/2004 | Schwindeman et al. |
| 7,612,144 | B2 | 11/2009 | Hogan et al. |
| 8,278,395 | B2 | 10/2012 | Kitigawa et al. |
| 8,362,164 | B2 | 1/2013 | Yon |
| 8,895,684 | B2 | 11/2014 | Thiele et al. |
| 8,916,665 | B2 * | 12/2014 | Lawson ............ C08F 4/48 526/178 |
| 8,921,502 | B2 | 12/2014 | Thiele et al. |
| 9,139,721 | B2 | 9/2015 | Sugiura |
| 9,365,660 | B2 | 6/2016 | Yan et al. |

(Continued)

FOREIGN PATENT DOCUMENTS

WO    2016/108715 A1    7/2016

OTHER PUBLICATIONS

CNIPA action in CN 201680066241.3, mailed Mar. 26, 2019.

(Continued)

*Primary Examiner* — Richard A Huhn
(74) *Attorney, Agent, or Firm* — Meredith E. Hooker; David G. Burleson

(57) ABSTRACT

An ethylenically unsaturated polymer includes at a terminus the radical of an allylic compound that includes a functional group free of active hydrogen atoms that is bonded to the allylic C atom through a S, P, Si or Sn atom and a vinyl aromatic compound. The polymer can be used as a component of a variety of elastomeric compounds used in the production of vulcanizates.

27 Claims, No Drawings

(56) References Cited

U.S. PATENT DOCUMENTS 9,475,924 B2 10/2016 Kameda et al.
2013/0281645 A1* 10/2013 Lawson ............ C08L 19/006
526/178

OTHER PUBLICATIONS

V.L. Blair et al., "The importance of the Lewis base in lithium mediated metallation and bond cleavage reaction of allyl amines and allyl phosphines," Chem. Commun., 2016, 52, pp. 8111-8114 (The Royal Society of Chemistry; London, UK).

C. Lichtenberg et al, "Structurally Defined Allyl Compounds of Main Group Metals," Angew. Chem. Int. Ed., 2013, 52, pp. 5228-5246 (Wiley-VCH Verlag GmbH & Co.; Weinheim, Germany).

J-F Biellmann et al., "Allylic and Benzylic Carbanions Substituted by Heteroatoms," Org. Reactions, 1982, 27, pp. 1-62.

D. Seyferth et al., "The Preparation of Substituted Allyllithium Reagents from Allyltin Compounds by Transmetalation," J. Organomet. Chem., 1979, vol. 177/11, pp. 53-65 (Elsevier Sequori S.A.; Lausanne, Switzerland).

C. Najera et al., "Functionalized Organolithium Compounds: New Synthetic Adventures," Current Org. Chem., 2003, 7, pp. 867-926 (Bentham Science Publishers Ltd.; Sharjah, UAE).

EPO examination report in EP appl. No. 16 866 809.3, dated Jun. 26, 2019.

Y. Horikawa et al., "Triallylstannyllithium-Allyllithium as an Initiator for the Anionic Reversible Chain Transfer Polymerization of 1,3-Butadiene," J. Poly. Sci, Part A: Polymer Chem., 1996, vol. 34, No. 7, pp. 1183-1188 (John Wiley & Sons, Inc.; Hoboken, NJ).

CNIPA examination report in CN 201680066241.3, dated Oct. 15, 2019.

* cited by examiner

FUNCTIONAL INITIATOR FOR ANIONIC POLYMERIZATION

CROSS-REFERENCE TO RELATED APPLICATION

This application is a national stage entry of international application no. PCT/US2016/056200, filed 8 Oct. 2016, which claims the benefit of U.S. provisional patent application No. 62/255,612, filed 16 Nov. 2015, the disclosure of which is incorporated herein by reference.

BACKGROUND INFORMATION

Rubber goods such as tire treads often are made from elastomeric compositions that contain one or more reinforcing materials such as, for example, particulate carbon black and silica; see, e.g., *The Vanderbilt Rubber Handbook*, 13th ed. (1990), pp. 603-04.

Good traction and resistance to abrasion are primary considerations for tire treads; however, motor vehicle fuel efficiency concerns argue for a minimization in their rolling resistance, which correlates with a reduction in hysteresis and heat build-up during operation of the tire. These considerations are, to a great extent, competing and somewhat contradictory: treads made from compositions designed to provide good road traction usually exhibit increased rolling resistance and vice versa.

Filler(s), polymer(s), and additives typically are chosen so as to provide an acceptable compromise or balance of the desired properties. Ensuring that reinforcing filler(s) are well dispersed throughout the elastomeric material(s) both enhances processability and acts to improve physical properties. Dispersion of filler particles can be improved by increasing their interaction with the elastomer(s) and/or decreasing their interaction with each other. Examples of efforts of this type include high temperature mixing in the presence of selectively reactive promoters, surface oxidation of compounding materials, and surface grafting.

The section of a polymer chain from the site of the last crosslink to an end of the polymer chain is a major source of hysteretic losses; this free end is not tied to the macromolecular network and thus cannot be involved in an efficient elastic recovery process and, as a result, energy transmitted to this section of the polymer (and vulcanizate in which such polymer is incorporated) is lost as heat. Ensuring that these polymer chain ends are tied to, or otherwise interact well with, reinforcing particulate fillers, is important to many vulcanizate physical properties such as, for example, reduced hysteresis.

Chemically modifying the polymer, typically at a terminus thereof, is one of the most effective ways of increasing interactivity of fillers and polymers. Terminal chemical modification often occurs by reaction of a living polymer with a functional terminating agent. Some of the numerous examples of this approach include U.S. Pat. Nos. 3,109,871, 4,647,625, 4,677,153, 5,109,907, 6,977,281, etc., as well as references cited therein and later publications citing these patents. Some of the most commonly employed synthetic elastomeric materials used in the manufacture of vulcanizates such as tire components include high-cis polybutadiene, often made by processes employing catalysts, and substantially random styrene/butadiene interpolymers, often made by processes employing anionic initiators. Post-polymerization terminal functionalization that can be performed with anionically initiated polymers often cannot be performed on coordination catalyzed polymers and, to a lesser extent, vice versa.

Terminal modification also can be provided by means of a functional initiator, in isolation or in combination with functional termination. Functional initiators typically are organolithium compounds that additionally include functionality, typically functionality that includes a nitrogen atom, capable of interacting with one or more types of particulate filler materials. Many of these functional initiators have relatively poor solubility in hydrocarbon solvents of the type commonly used in anionic (living) polymerizations, and many do not maintain propagation of living ends as well as more common alkyllithium initiators such as n-butyllithium. Both of these characteristics can negatively impact polymerization rate and efficiency.

This degradation in the ability to propagate living ends can be countered somewhat by conducting polymerizations at lower temperatures, i.e., less than 100° C., often less than 90° C. or even 80° C. Such temperature control is not always possible or practical, however, particularly when a continuous or semi-continuous polymerization process is desired.

Functional initiators that retain good initiation performance in anionic polymerizations conducted at elevated temperatures remain desirable.

SUMMARY

Provided herein is an anionic polymerization method for providing ethylenically unsaturated polymers. The method employs a functional initiator which efficiently propagates living ends at production scale temperatures.

In one aspect is provided an initiating compound having the general formula

where M is a Group 1 metal and Q is a functional group that is free of active hydrogen atoms and that is bonded to the allylic C atom of the allyl anion through a S, P, Si or Sn atom.

Initiating compounds such as those defined by general formula (I) can be provided by reacting a compound defined by the formula RM where M is defined as above and R is a substituted or unsubstituted hydrocarbyl group free of active hydrogen atoms with an allylic compound defined by the general formula

where Q is defined as above.

Also provided is a polymer that includes a radical of a general formula (I) compound at its terminus. Some embodiments of the resulting polymer, in its carbanionic form, can be represented by one of the following general formulae:

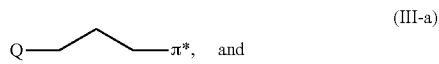

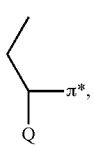

(III-b)

where Q is defined as above and π* represents a carbanionic (living) polymer, typically one which includes polyene mer.

The polymer can be prepared from ethylenically unsaturated monomers, typically including one or more types of polyene, optionally further including one or more types of vinyl aromatic compounds. In certain embodiments, the polyene(s) can be conjugated dienes, and the resulting conjugated diene mer can incorporated substantially randomly along the polymer chain. In these and other embodiments, the polymer can be substantially linear.

The polymer optionally can be provided with terminal functionality (in addition to that provided by the initiator radical) by reaction with a terminating compound, coupling agent or linking agent.

The polymer can interact with particulate filler such as, but not limited to, carbon black. Compositions, including vulcanizates, that include particulate fillers and such polymers also are provided, as are methods of providing and using such compositions.

Methods of providing the polymer, regardless of how characterized, also are provided.

Other aspects of the present invention will be apparent to the ordinarily skilled artisan from the detailed description that follows. To assist in understanding that description, certain definitions are provided immediately below, and these are intended to apply throughout unless the surrounding text explicitly indicates a contrary intention:

"polymer" means the polymerization product of one or more monomers and is inclusive of homo-, co-, ter-, tetra-polymers, etc.;

"mer" or "mer unit" means that portion of a polymer derived from a single reactant molecule (e.g., ethylene mer has the general formula —CH$_2$CH$_2$—);

"copolymer" means a polymer that includes mer units derived from two reactants, typically monomers, and is inclusive of random, block, segmented, graft, etc., copolymers;

"interpolymer" means a polymer that includes mer units derived from at least two reactants, typically monomers, and is inclusive of copolymers, terpolymers, tetrapolymers, and the like;

"random interpolymer" means an interpolymer having mer units derived from each type of constituent monomer incorporated in an essentially non-repeating manner and being substantially free of blocks, i.e., segments of three or more of the same mer;

"gum Mooney viscosity" is the Mooney viscosity of an uncured polymer prior to addition of any filler(s);

"compound Mooney viscosity" is the Mooney viscosity of a composition that includes, inter alia, an uncured or partially cured polymer and particulate filler(s);

"substituted" means one containing a heteroatom or functionality (e.g., hydrocarbyl group) that does not interfere with the intended purpose of the group in question;

"directly bonded" means covalently attached with no intervening atoms or groups;

"polyene" means a molecule with at least two double bonds located in the longest portion or chain thereof, and specifically is inclusive of dienes, trienes, and the like;

"polydiene" means a polymer that includes mer units from one or more dienes;

"phr" means parts by weight (pbw) per 100 pbw rubber;

"radical" or "residue" means the portion of a molecule that remains after reacting with another molecule, regardless of whether any atoms are gained or lost as a result of the reaction;

"aryl group" means a phenyl group or a polycyclic aromatic radical;

"ring structure" means a cyclic group; and

"terminus" means an end of a polymeric chain;

"terminal moiety" means a group or functionality located at a terminus; and

"reactive polymer" means a polymer having at least one site which, because of the presence of an active terminus, readily reacts with other molecules, with the term being inclusive of, inter alia, carbanionic polymers.

Throughout this document, all values given in the form of percentages are weight percentages (w/w) unless the surrounding text explicitly indicates a contrary intention. The relevant teachings of all patent documents mentioned throughout are incorporated herein by reference.

DETAILED DESCRIPTION

As apparent from the foregoing, polymers provided according to the present method can be described or characterized in a variety of ways.

The polymer can be provided by a process in which a general formula (I) compound is used to initiate anionic (living) polymerization of one or more types of unsaturated monomers. The polymer desirably can include polyene mer, particularly diene mer units and more particularly conjugated diene mer, and optionally vinyl aromatic mer units.

The polymer can be elastomeric and can include mer units that include unsaturation. Unsaturated mer can result from incorporation of polyenes, particularly dienes and trienes (e.g., myrcene). Illustrative polyenes include $C_4$-$C_{12}$ dienes, particularly conjugated dienes such as, but not limited to, 1,3-butadiene, isoprene, 1,3-pentadiene, 2,3-dimethyl-1,3-butadiene, and 1,3-hexadiene.

Polyenes can incorporate into polymeric chains in more than one way. Especially for polymers targeted for tire tread applications, controlling this manner of incorporation can be desirable. Techniques for achieving this control are discussed below.

A polymer chain with an overall 1,2-microstructure, given as a numerical percentage based on total polyene content, of from ~10 to ~80%, optionally from ~25 to 65%, can be desirable for certain end use applications. A polymer that has an overall 1,2-microstructure of no more than ~50%, preferably no more than ~45%, more preferably no more than ~40%, even more preferably no more than ~35%, and most preferably no more than ~30%, based on total polyene content, is considered to be "substantially linear."

Directly bonded pendent aromatic groups can be provided by mer units derived from vinyl aromatics, particularly the $C_8$-$C_{20}$ vinyl aromatics such as, e.g., styrene, α-methyl styrene, p-methyl styrene, the vinyl toluenes, the vinyl naphthalenes, and the like. When used in conjunction with one or more polyenes, mer units with pendent aromaticity can constitute from ~1 to ~50%, from ~10 to ~45%, or from ~20 to ~35%, of the polymer chain. The microstructure of such interpolymers can be random, i.e., the mer units derived from each type of constituent monomer do not form blocks and, instead, are incorporated in an essentially non-repeating manner. Random microstructure can provide particular benefit in some end use applications such as, e.g., rubber compositions used in the manufacture of tire treads.

Exemplary elastomers include interpolymers of one or more polyenes and styrene such as, e.g., poly(styrene-co-butadiene), also known as SBR.

The foregoing types of polymers can be made by emulsion polymerization or solution polymerization, with the latter affording greater control with respect to such properties as randomness, microstructure, etc. Solution polymerizations have been performed since about the mid-20th century, so the general aspects thereof are known to the ordinarily skilled artisan; nevertheless, certain aspects are provided here for convenience of reference.

Both polar solvents, such as THF, and non-polar solvents can be employed in solution polymerizations, with the latter type being more common in industrial practice. Examples of non-polar solvents typically employed in anionically initiated solution polymerizations include various $C_5$-$C_{12}$ cyclic and acyclic alkanes as well as their alkylated derivatives, certain liquid aromatic compounds, and mixtures thereof. The ordinarily skilled artisan is aware of other useful solvent options and combinations.

In solution polymerizations, both randomization and vinyl content (i.e., 1,2-microstructure) can be increased by the inclusion in the polymerization ingredients of a coordinator, usually a polar compound. Up to 90 or more equivalents of coordinator per equivalent of initiator can be used, with the amount depending on, for example, the amount of vinyl content desired, the level of non-polyene monomer employed, the reaction temperature, and nature of the specific coordinator employed. Compounds useful as coordinators include organic compounds that include a heteroatom having a non-bonded pair of electrons, particularly O or N. Examples include dialkyl ethers of mono- and oligo-alkylene glycols; crown ethers; tertiary amines such as tetramethylethylene diamine; THF; THF oligomers; linear and cyclic oligomeric oxolanyl alkanes (see, e.g., U.S. Pat. No. 4,429,091) such as 2,2-bis(2'-tetrahydrofuryl)propane, dipiperidyl ethane, hexamethylphosphoramide, N,N'-dimethylpiperazine, diazabicyclooctane, diethyl ether, tributylamine, and the like.

Although the ordinarily skilled artisan understands the conditions typically employed in solution polymerization, a representative description is provided for convenience of the reader. The following is based on a batch process, although extending this description to, e.g., semi-batch or continuous processes is within the capability of the ordinarily skilled artisan. Depending on the nature of the polymer desired, the particular conditions of the solution polymerization can vary significantly.

Anionic polymerizations typically employ an alkyllithium initiator, such as n-butyllithium; a so-called multifunctional initiator, which is capable of forming polymers with more than one living end; or a functionalized initiator, many of which are poorly soluble in the types of solvents set forth above and/or unable to maintain good propagation of live ends.

Advantageously, the functional initiators described herein are both soluble in the types of organic liquids commonly employed as solvents in solution polymerizations and can maintain propagation of live ends at relatively high temperatures.

A general formula (I)-type compound can be provided by reacting a RM compound, with R and M being defined as above, with an allylic compound defined by general formula (II).

Exemplary RM compounds include any of those where M is one of Na, Li, K or Cs and R is a substituted or unsubstituted aryl, (cyclo)alkyl, alkaryl, or aralkyl group, most commonly a $C_1$-$C_6$ alkyl group, a $C_5$-$C_6$ cycloalkyl group or a $C_6$ aryl group. Highly preferred R groups are those which yield RM compounds that are soluble in the polymerization solvents mentioned above such as, for example, n-butyllithium.

Q from the allylic compound defined by general formula (II) is a functional group that is free of active hydrogen atoms and that is bonded to the allylic C atom of the allyl anion through a S, P, Si or Sn atom. Generic formulae for such compounds include

 (IIa)

 (IIb)

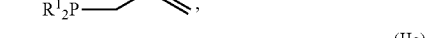 (IIc)

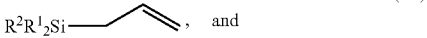 (IId)

where each $R^1$ independently is a hydrocarbyl group that is free of ethylenic unsaturation and active H atoms and each $R^2$ independently is $R^1$, a $NR^1_2$ group, or a substituted hydrocarbyl group that is free of ethylenic unsaturation and active H atoms. Preferred $R^1$ groups include $C_1$-$C_6$ alkyl groups (particularly linear alkyl groups), aryl (particularly phenyl) groups and cycloalkyl (particularly $C_5$-$C_6$ cycloalkyl), while exemplary $R^2$ groups (other than R') include —$NR^{1a}_2$ where each $R^{1a}$ represents the aforementioned preferred $R^1$ groups.

Because of the reactivity of M ions, the initiating compound cannot be made in the presence of ethylenically unsaturated monomers. The initiating compound can be made external to the polymerization vessel and then added thereto when polymerization is ready to be undertaken or by preparing it in the polymerization vessel prior to introduction of the monomeric compound(s) thereto.

A batch polymerization typically begins by charging a blend of monomer(s) and solvent to a suitable reaction vessel, at a temperature of from about ~80° to ~100° C., more commonly from about ~40° to ~50° C., and typically from ~0° to ~30° C. The solution then can be heated to a temperature of from about ~70° to ~150° C., more commonly from about ~20° to ~120° C., and typically from ~50° to ~100° C. A coordinator (if used) and initiator are added to the reaction vessel, often are added as part of a solution or blend. (Alternatively, the monomer(s) and coordinator can be added to the vessel after introduction of the initiator. The aforementioned temperature ranges are applicable to this alternative as well.)

The vessel contents typically are agitated to at least some degree, and the polymerization preferably is conducted under anaerobic conditions provided by an inert protective gas such as $N_2$, Ar or He. Polymerization pressure employed may vary widely, although typically a pressure of from ~0.1 to ~1 MPa is employed.

After the initiating compound and ethylenically unsaturated monomers are introduced, polymerization is allowed to proceed for a period of time sufficient to result in the formation of the desired functional polymer which, in batch processes, typically ranges from ~0.01 to ~100 hours, more commonly from ~0.08 to ~48 hours, and typically from ~0.15 to ~2 hours.

The polymerization temperature can vary widely, depending on a variety of factors, although polymerization vessel temperatures of from ~20° to ~90° C. are common, but temperatures up to ~120° C. are possible. Heat can be removed from the polymerization vessel by external cooling and/or evaporation of the monomer or solvent.

After a desired degree of conversion has been reached, the heat source (if used) can be removed and, if the reaction vessel is to be reserved solely for polymerizations, the reaction mixture can be removed to a post-polymerization vessel for functionalization and/or quenching. At this point, the reaction mixture commonly is referred to as a "polymer cement" because of its relatively high concentration of polymer.

A quenched sample of the resulting polymer typically exhibits a gum Mooney viscosity ($ML_4/100°$ C.) of from ~2 to ~150, more commonly from ~2.5 to ~125, even more commonly from ~5 to ~100, and most commonly from ~10 to ~75; the foregoing generally correspond to a number average molecular weight (Mn) of from 5,000 to 250,000 Daltons, commonly from 10,000 to 200,000 Daltons, more commonly from 25,000 to 150,000 Daltons, and most commonly from 50,000 to 125,000 Daltons. The resulting interpolymer typically has a molecular weight distribution ($M_w/M_n$, with $M_w$ representing weight average molecular weight) of from 1 to 10, commonly from 1.5 to 7.5, and more commonly from 2 to 5. (Both Mn and Mw can be determined by GPC using polystyrene standards for calibration and appropriate Mark-Houwink constants.)

The polymer is considered to include terminal functionality from the radical of the general formula (I) initiator; see general formulas (III-a) and (II-b). However, where additional or other functionality is desired to enhance interaction with particulate filler, the polymer can be further functionalized by reaction with an appropriate terminating reagent, coupling agent and/or linking agent. The ordinarily skilled artisan is familiar with numerous examples of terminal functionalities that can be provided through this type of post-polymerization functionalization. For additional details, the interested reader is directed to any of U.S. Pat. Nos. 4,015,061, 4,616,069, 4,935,471, 5,153,159, 5,149,457, 5,196,138, 5,329,005, 5,496,940, 5,502,131, 5,567,815, 5,610,227, 5,663,398, 5,786,441, 6,812,295, 7,153,919, 7,816,483, 8,063,153, 8,183,326, 8,586,691, 8,642,706 8,680,210 and 9,221,923, etc., as well as references cited in these patents and later publications citing these patents. Specific exemplary functionalizing compounds include $SnCl_4$, $R^3_3SnCl$, $R^3_2SnCl_2$, $R^3SnCl_3$, carbodiimides, N-cyclic amides, N,N'-disubstituted cyclic ureas, cyclic amides, cyclic ureas, isocyanates, Schiff bases, 4,4'-bis(diethylamino) benzophenone, alkyl thiothiazolines, alkoxysilanes (e.g., $Si(OR^3)_4$, $R^2Si(OR^3)_3$, $R^3_2Si(OR^3)_2$, etc.) cyclic siloxanes and mixtures thereof. (In the foregoing, each $R^3$ independently is a $C_1$-$C_{20}$ alkyl group, $C_3$-$C_{20}$ cycloalkyl group, $C_6$-$C_{20}$ aryl group, or $C_7$-$C_{20}$ aralkyl group.) Specific examples of preferred functionalizing compounds include $SnCl_4$, tributyl tin chloride, dibutyl tin dichloride, and 1,3-dimethyl-2-imidazolidinone (DMI).

Reaction of the foregoing types of compounds with a terminally active polymer can be performed in less than ~100 minutes, often fewer than ~50 minutes, at moderate temperatures, e.g., 0° to 75° C. Reaction typically occurs between a C atom of the polymer chain and a Si atom of the cyclic siloxane, silazane, etc. Because of the reactivity of carbanionic (living) polymers, the molar or equivalent amount of functionalizing compound need be no greater than essentially 1:1 relative to the amount of initiator employed in the polymerization. although lower and higher ratios certainly can be employed.

Quenching can be conducted by stirring the polymer and an active hydrogen-containing compound, such as an alcohol or acid, for up to ~120 minutes at temperatures of from ~25° to ~150° C.

The polymer product can be recovered from the polymerization mixture using known techniques. For example, a polymerization mixture can be passed through a heated screw apparatus, such as a desolventizing extruder, in which volatile substances (e.g., low boiling solvents and unreacted monomers) are removed by evaporation at appropriate temperatures (e.g., ~100° to ~170° C.) under no more than atmospheric pressure. Another option involves steam desolvation followed by drying the resulting polymer crumbs in a hot air tunnel. Yet another option involves recovering the polymer directly by drying the polymerization mixture on a drum dryer. Any of the foregoing can be combined with coagulation with water, alcohol or steam; if coagulation is performed, an elevated temperature drying technique may be desirable.

The resulting polymer can be utilized in a tread stock compound or can be blended with any conventionally employed tread stock rubber including natural rubber and/or non-functionalized synthetic rubbers such as, e.g., one or more of homo- and interpolymers that include just polyene-derived mer units (e.g., poly(butadiene), poly(isoprene), and copolymers incorporating butadiene, isoprene, and the like), SBR, butyl rubber, neoprene, EPR, EPDM, acrylonitrile/butadiene rubber (NBR), silicone rubber, fluoroelastomers, ethylene/acrylic rubber, EVA, epichlorohydrin rubbers, chlorinated polyethylene rubbers, chlorosulfonated polyethylene rubbers, hydrogenated nitrile rubber, tetrafluoroethylene/propylene rubber and the like. When a functionalized polymer(s) is blended with conventional rubber(s), the amounts can vary from ~5 to ~99% of the total rubber, with the conventional rubber(s) making up the balance of the total rubber. The minimum amount depends to a significant extent on the degree of hysteresis reduction desired.

Amorphous silica ($SiO_2$) can be utilized as a filler. Silicas are generally classified as wet-process, hydrated silicas because they are produced by a chemical reaction in water, from which they are precipitated as ultrafine, spherical particles. These primary particles strongly associate into aggregates, which in turn combine less strongly into agglomerates. "Highly dispersible silica" is any silica having a very substantial ability to de-agglomerate and to disperse in an elastomeric matrix, which can be observed by thin section microscopy.

Surface area gives a reliable measure of the reinforcing character of different silicas; the Brunauer, Emmet and Teller ("BET") method (described in *J. Am. Chem. Soc.*, vol. 60, p. 309 et seq.) is a recognized method for determining surface area. BET surface area of silicas generally is less than 450 $m^2/g$, and useful ranges of surface include from ~32 to ~400 $m^2/g$, ~100 to ~250 $m^2/g$, and ~150 to ~220 $m^2/g$.

The pH of the silica filler is generally from ~5 to ~7 or slightly over, preferably from ~5.5 to ~6.8.

Some commercially available silicas which may be used include Hi-Sil™ 215, Hi-Sil™ 233, and Hi-Sil™ 190 (PPG Industries, Inc.; Pittsburgh, Pa.). Other suppliers of commercially available silica include Grace Davison (Baltimore, Md.), Degussa Corp. (Parsippany, N.J.), Rhodia Silica Systems (Cranbury, N.J.), and J.M. Huber Corp. (Edison, N.J.).

Silica can be employed in the amount of ~1 to ~100 phr, preferably in an amount from ~5 to ~80 phr. The useful upper range is limited by the high viscosity that such fillers can impart.

Other useful fillers include all forms of carbon black including, but not limited to, furnace black, channel blacks and lamp blacks. More specifically, examples of the carbon blacks include super abrasion furnace blacks, high abrasion furnace blacks, fast extrusion furnace blacks, fine furnace blacks, intermediate super abrasion furnace blacks, semi-reinforcing furnace blacks, medium processing channel blacks, hard processing channel blacks, conducting channel blacks, and acetylene blacks; mixtures of two or more of these can be used. Carbon blacks having a surface area (EMSA) of at least 20 $m^2/g$, preferably at least ~35 $m^2/g$, are preferred; surface area values can be determined by ASTM D-1765 using the CTAB technique. The carbon blacks may be in pelletized form or an unpelletized flocculent mass, although unpelletized carbon black can be preferred for use in certain mixers.

The amount of carbon black can be up to ~50 phr, with ~5 to ~40 phr being typical. When carbon black is used with silica, the amount of silica can be decreased to as low as ~1 phr; as the amount of silica decreases, lesser amounts of the processing aids, plus silane if any, can be employed.

Elastomeric compounds typically are filled to a volume fraction, which is the total volume of filler(s) added divided by the total volume of the elastomeric stock, of ~25%; accordingly, typical (combined) amounts of reinforcing fillers, i.e., silica and carbon black, is ~30 to 100 phr.

When silica is employed as a reinforcing filler, addition of a coupling agent such as a silane is customary so as to ensure good mixing in, and interaction with, the elastomer(s). Generally, the amount of silane that is added ranges between ~4 and 20%, based on the weight of silica filler present in the elastomeric compound.

Coupling agents are compounds which include a functional group capable of bonding physically and/or chemically with a group on the surface of the silica filler (e.g., surface silanol groups) and a functional group capable of bonding with the elastomer (e.g., via a sulfurcontaining linkage). Such coupling agents include organosilanes, in particular polysulfurized alkoxysilanes (see, e.g., U.S. Pat. Nos. 3,873,489, 3,978,103, 3,997,581, 4,002,594, 5,580,919, 5,583,245, 5,663,396, 5,684,171, 5,684,172, 5,696,197, etc.) or polyorganosiloxanes bearing the types of functionalities mentioned above. An exemplary coupling agent is bis[3-(triethoxysilyl)propyl]tetrasulfide. One or more coupling agents can be added to the elastomeric (rubber) composition if desired, although the functionalized polymer of the present invention can be utilized in elastomeric compositions that do not include such coupling agents.

Addition of a processing aid can be used to reduce the amount of silane employed. See, e.g., U.S. Pat. No. 6,525,118 for a description of fatty acid esters of sugars used as processing aids. Additional fillers useful as processing aids include, but are not limited to, mineral fillers, such as clay (hydrous aluminum silicate), talc (hydrous magnesium silicate), and mica as well as non-mineral fillers such as urea and sodium sulfate. Preferred micas contain principally alumina, silica and potash, although other variants also can be useful. The additional fillers can be utilized in an amount of up to ~40 phr, typically up to ~20 phr.

Other conventional rubber additives also can be added. These include, for example, process oils, plasticizers, anti-degradants such as antioxidants and antiozonants, curing agents and the like.

All of the ingredients can be mixed using standard equipment such as, e.g., Banbury or Brabender mixers. Typically, mixing occurs in two or more stages. During the first stage (often referred to as the masterbatch stage), mixing typically is begun at temperatures of ~120° to ~130° C. and increases until a so-called drop temperature, typically ~165° C., is reached.

Where a formulation includes silica, a separate re-mill stage often is employed for separate addition of the silane component(s). This stage often is performed at temperatures similar to, although often slightly lower than, those employed in the masterbatch stage, i.e., ramping from ~90° C. to a drop temperature of ~150° C.

Reinforced rubber compounds conventionally are cured with about 0.2 to about 5 phr of one or more known vulcanizing agents such as, for example, sulfur or peroxide-based curing systems. For a general disclosure of suitable vulcanizing agents, the interested reader is directed to an overview such as that provided in Kirk-Othmer, *Encyclopedia of Chem. Tech.*, 3d ed., (Wiley Interscience, New York, 1982), vol. 20, pp. 365-468. Vulcanizing agents, accelerators, etc., are added at a final mixing stage. To ensure that onset of vulcanization does not occur prematurely, this mixing step often is done at lower temperatures, e.g., starting at ~60° to ~65° C. and not going higher than ~105° to ~110° C.

Certain tests have come to be recognized as correlating certain physical properties of vulcanizates with performance of products, particularly tire treads, made therefrom. For example, reductions in hysteresis (heat build-up during operation) have been found to correlate with higher rebound values and lower loss tangent values (tan δ) at high temperature, better handling performance often correlates with higher elastic modulus values at high temperature and strain, ice traction has been found to correlate with lower modulus values at low temperatures, etc. (In the foregoing, "high temperature" typically is considered to be ~50° to 65° C. while "low temperature" is considered to be ~0° to ~25° C.) Further, as a general rule, the lowest possible ∴ tan δ generally is desirable.

Various embodiments of the present invention have been provided by way of example and not limitation. As evident from the foregoing descriptions, general preferences regarding features, ranges, numerical limitations and embodiments are to the extent feasible, as long as not interfering or incompatible, envisioned as being capable of being combined with other such generally preferred features, ranges, numerical limitations and embodiments.

The following non-limiting, illustrative examples provide the reader with detailed conditions and materials that can be useful in the practice of the present invention. These examples employ 1,3-butadiene as an exemplary polyene and styrene as an exemplary vinyl aromatic compound due to a variety of factors including cost, availability, ability to handle and, most importantly, ability to make internal comparisons as well as comparisons against previously reported polymers. The ordinarily skilled artisan will be able to extend these examples to a variety of homo- and interpolymers.

EXAMPLES

In the examples, dried glass vessels previously sealed with extracted septum liners and perforated crown caps under a positive N$_2$ purge were used for all preparations. Butadiene solution (19.1% in hexane), styrene (33.5% in hexane), hexane, n-butyllithium (n-BuLi, 1.6 M in hexane), 2,2-bis(2'-tetrahydrofuryl)propane (1.6 M solution in hexane, stored over CaH$_2$), tin(IV) chloride (0.25 M solution in hexane) and butylated hydroxytoluene (BHT) solution in hexane were used.

Commercially available reagents and starting materials included the following, all of which used without further purification unless otherwise noted in a specific example:
- from Sigma-Aldrich Co. (St. Louis, Mo.)—allyl methyl sulfide, allyl(diethylamino)dimethylsilane, allyltrimethylsilane, allyltributylstannane, and allyldiphenylphosphine;
- from Gelest Inc. (Morrisville, Pa.)—3-(1,3-dimethylbutylidene)aminopropyltriethoxysilane (AP3E, 3.0 M) and 2-(3,4-epoxycyclohexyl)ethyltrimethoxysilane (ECH3M; 4.3 M).

Testing data in the Examples was performed on filled compositions made according to the formulations shown in Tables 1a (a formulation employing only silica as a particulate filler) and 1b (a formulation employing only carbon black as a particulate filler). In these tables, N-phenyl-N'-(1,3-dimethylbutyl)-p-phenyldiamine acts as an antioxidant while 2,2'-dithiobisbenzothiazole, N-t-butylbenzothiazole-2-sulfenamide, and N,N'-diphenylguanidine act as accelerators. These formulations are used to permit evaluation of functionalized polymers with specific particulate fillers, but this should not be considered limiting because mixtures of carbon black and silica, as well as the presence of additional types of particulate fillers, are envisioned.

TABLE 1A

Composition for vulcanizates, silica filler

| | Amount (phr) |
|---|---|
| Masterbatch | |
| synthesized polymer | 80 |
| poly(isoprene) (natural rubber) | 20 |
| silica | 52.5 |
| wax | 2 |
| N-phenyl-N'-(1,3-dimethylbutyl)-p-phenyldiamine | 0.95 |
| stearic acid | 2 |
| processing oil (low PCA content) | 10 |
| Re-mill | |
| silica | 2.5 |
| silane | 5 |
| Final | |
| sulfur | 1.5 |
| ZnO | 2.5 |
| 2,2'-dithiobisbenzothiazole | 2.0 |
| N-t-butylbenzothiazole-2-sulfenamide | 0.7 |
| N,N'-diphenylguanidine | 0.2 |
| TOTAL | 183.05 |

TABLE 1B

Composition for vulcanizates, carbon black filler

| | Amount (phr) |
|---|---|
| Masterbatch | |
| synthesized polymer | 100 |
| carbon black (N343 type) | 50 |
| wax | 2 |
| N-phenyl-N'-(1,3-dimethylbutyl)-p-phenyldiamine | 0.95 |
| stearic acid | 2 |
| processing oil (low PCA content) | 10 |
| Final | |
| sulfur | 1.5 |
| ZnO | 2.5 |
| 2,2'-dithiobisbenzothiazole | 0.5 |
| N-t-butylbenzothiazole-2-sulfenamide | 0.5 |
| N,N'-diphenylguanidine | 0.3 |
| TOTAL | 170.25 |

Data corresponding to "Bound rubber" were determined using a procedure based on that described by J. J. Brennan et al., *Rubber Chem. and Tech.*, 40, 817 (1967).

Molecular weight data were determined via GPC, as described above.

Gum and compound Mooney viscosity (ML$_{1+4}$) values were determined with an Alpha Technologies™ Mooney viscometer (large rotor) using a one-minute warm-up time and a 4-minute running time; t$_{80}$ is the time (in sec, beginning at the point that disk of the viscometer is stopped) necessary for 80% of the Mooney viscosity to decay; tensile mechanical properties were determined using the standard procedure described in ASTM-D412; hysteresis (tan δ) data were obtained from dynamic experiments conducted at 60° C. and 10 Hz (strain sweep).

Examples 1-4: Control Polymerizations, n-Butyllithium

To a N$_2$-purged reactor equipped with a stirrer was added 1.36 kg hexane, 0.45 kg styrene solution, and 3.14 kg butadiene solution. The reactor was charged with 3.6 mL n-BuLi solution, followed by 1.1 mL 2,2-bis(2'-tetrahydrofuryl)propane solution. The reactor jacket was heated to 50° C. and, after ~33 minutes, the batch temperature peaked at ~65° C.

After an additional ~30 minutes, portions of the polymer cement were transferred to four glass bottles. To one of the bottles (designated sample 1 below) was added isopropanol so as to quench the living polymer while, to the other bottles, were added
- sample 2-0.17 mL AP3E,
- sample 3-0.12 mL ECH3M, and
- sample 4-0.5 mL SnCl$_4$ solution (0.25 M in hexane).

Each bottle was placed in a 50° C. bath. After ~30 minutes, the bottles were removed, and the contents of each were separately coagulated in isopropanol containing BHT before being drum dried.

Certain properties of these polymers are summarized below in Table 2.

Examples 5-8: Polymerizations, P-Allylic Initiator

To a mixture of 10 mL dried cyclohexane and 1.18 mL allyldiphenylphosphine (4.63 M) was added 3.6 mL n-BuLi solution followed by 1.1 mL 2,2-bis(2'-tetrahydrofuryl)propane solution. The contents were allowed to stir at room temperature for an additional ~15 minutes.

The procedure from Examples 1-4 was essentially repeated with the foregoing functional initiator solution being added in place of the separate n-BuLi and 2,2-bis(2'-tetrahydrofuryl)propane solutions. This time, the batch temperature peaked at ~66° C. after ~43 minutes.

After an additional ~30 minutes, portions of the polymer cement were transferred to four glass bottles. Samples 5-8 were quenched or reacted the same as, respectively, samples 1-4. The bottles were processed similarly to those from Examples 1-4.

Certain properties of these polymers are summarized below in Table 2.

Examples 9-12: Polymerizations, Sn-Allylic Initiator

To a mixture of 10 mL dried cyclohexane and 1.7 mL allyltributylstannane (3.22 M) was added 3.6 mL n-BuLi solution followed by 1.1 mL 2,2-bis(2'-tetrahydrofuryl)propane solution. The contents were allowed to stir at room temperature for an additional ~15 minutes.

The procedure from Examples 1-4 was essentially repeated with the foregoing functional initiator solution being added in place of the separate n-BuLi and 2,2-bis(2'-tetrahydrofuryl)propane solutions. This time, the batch temperature peaked at ~65° C. after ~35 minutes.

After an additional ~30 minutes, portions of the polymer cement were transferred to four glass bottles. Samples 9-12 were quenched or reacted the same as, respectively, samples 1-4. The bottles were processed similarly to those from Examples 1-4.

Certain properties of these polymers are summarized below in Table 2.

Examples 13-16: Polymerizations, Si-Allylic Initiator

To a mixture of 10 mL dried cyclohexane and 0.87 mL allyltrimethylsilane (6.29 M) was added 3.6 mL n-BuLi solution followed by 1.1 mL 2,2-bis(2'-tetrahydrofuryl)propane solution. The contents were allowed to stir at room temperature for an additional ~15 minutes.

The procedure from Examples 1-4 was essentially repeated with the foregoing functional initiator solution being added in place of the separate n-BuLi and 2,2-bis(2'-tetrahydrofuryl)propane solutions. This time, the batch temperature peaked at ~67° C. after ~27 minutes.

After an additional ~30 minutes, portions of the polymer cement were transferred to four glass bottles. Samples 13-16 were quenched or reacted the same as, respectively, samples 1-4. The bottles were processed similarly to those from Examples 1-4.

Certain properties of these polymers are summarized below in Table 2.

Examples 17-20: Polymerizations, Alternative Si-Allylic Initiator

To a mixture of 10 mL dried cyclohexane and 1.18 mL allyl(diethylamino)dimethylsilane (4.64 M) was added 3.6 mL n-BuLi solution followed by 1.1 mL 2,2-bis(2'-tetrahydrofuryl)propane solution. The contents were allowed to stir at room temperature for an additional ~15 minutes.

The procedure from Examples 1-4 was essentially repeated with the foregoing functional initiator solution being added in place of the separate n-BuLi and 2,2-bis(2'-tetrahydrofuryl)propane solutions. This time, the batch temperature peaked at ~65° C. after ~33 minutes.

After an additional ~30 minutes, portions of the polymer cement were transferred to four glass bottles. Samples 17-20 were quenched or reacted the same as, respectively, samples 1-4. The bottles were processed similarly to those from Examples 1-4.

Certain properties of these polymers are summarized below in Table 2.

Examples 21-24: Polymerizations, S-Allylic Initiator

To a mixture of 10 mL dried cyclohexane and 0.6 mL allyl methyl sulfide (9.10 M) was added 3.6 mL n-BuLi solution followed by 1.1 mL 2,2-bis(2'-tetrahydrofuryl)propane solution. The contents were allowed to stir at room temperature for an additional ~15 minutes.

The procedure from Examples 1-4 was essentially repeated with the foregoing functional initiator solution being added in place of the separate n-BuLi and 2,2-bis(2'-tetrahydrofuryl)propane solutions. This time, the batch temperature peaked at ~69° C. after ~33 minutes.

After an additional ~30 minutes, portions of the polymer cement were transferred to four glass bottles. Samples 5-8 were quenched or reacted the same as, respectively, samples 1-4. The bottles were processed similarly to those from Examples 1-4.

Certain properties of these polymers are summarized below in Table 2.

TABLE 2

| | Polymer properties | | | | | | |
|---|---|---|---|---|---|---|---|
| | $M_n$ (kg/mol) | $M_p$ (kg/mol) | $M_w/M_n$ | % coupling | $T_g$ (° C.) | $ML_{1+4}$ @ 100° C. | $t_{80}$ (sec) |
| sample 1 | 118 | 121 | 1.06 | 0 | −38.0 | 12.7 | 0.94 |
| sample 2 | 145 | 121 | 1.40 | 36.1 | −36.9 | 18.6 | 1.10 |
| sample 3 | 143 | 121 | 1.29 | 31.5 | −37.3 | 29.4 | 1.35 |
| sample 4 | 289 | 399 | 1.27 | 88.1 | −38.0 | 92.6 | 6.39 |
| sample 5 | 136 | 165 | 1.16 | 0 | −45.5 | 29.4 | 1.03 |
| sample 6 | 149 | 165 | 1.22 | 11.9 | −46.3 | 39.2 | 1.23 |
| sample 7 | 166 | 167 | 1.32 | 27.5 | −45.7 | 55.4 | 1.58 |
| sample 8 | 265 | 487 | 1.49 | 73.0 | −45.3 | 107.2 | 6.03 |
| sample 9 | 149 | 156 | 1.06 | 0 | −37.3 | — | — |
| sample 10 | 166 | 157 | 1.32 | 20.8 | −40.0 | — | — |
| sample 11 | 174 | 157 | 1.24 | 24.9 | −38.0 | — | — |
| sample 12 | 292 | 477 | 1.40 | 75.0 | −38.9 | — | — |
| sample 13 | 111 | 113 | 1.06 | 2.6 | −38.5 | — | — |
| sample 14 | 136 | 113 | 1.41 | 34.2 | −38.5 | — | — |

TABLE 2-continued

| | Polymer properties | | | | | | |
|---|---|---|---|---|---|---|---|
| | $M_n$ (kg/mol) | $M_p$ (kg/mol) | $M_w/M_n$ | % coupling | $T_g$ (°C.) | $ML_{1+4}$ @ 100° C. | $t_{80}$ (sec) |
| sample 15 | 136 | 114 | 1.31 | 33.7 | −39.0 | — | — |
| sample 16 | 270 | 376 | 1.28 | 87.5 | −39.3 | — | — |
| sample 17 | 116 | 119 | 1.06 | 0 | −38.7 | — | — |
| sample 18 | 129 | 118 | 1.33 | 35.0 | −39.0 | — | — |
| sample 19 | 138 | 119 | 1.28 | 31.0 | −38.9 | — | — |
| sample 20 | 242 | 394 | 1.49 | 90.0 | −39.6 | — | — |
| sample 21 | 118 | 127 | 1.07 | 0 | −40.5 | — | — |
| sample 22 | 120 | 127 | 1.20 | 13.5 | −39.8 | — | — |
| sample 23 | 147 | 128 | 1.33 | 32.0 | −40.0 | — | — |
| sample 24 | 265 | 410 | 1.39 | 82.8 | −39.9 | — | — |

Examples 25-48: Vulcanizates

Using the formulations from Table 1a and Table 1b above, vulcanizable elastomeric compounds containing reinforcing fillers were prepared from samples 5-8 and 16-24. Compounds were cured for ~15 minutes at 171° C. to provide vulcanizates 25-48.

Results of physical testing on vulcanizates made from these polymers are summarized below in Tables 3a-3c.

TABLE 3A

Compound and vulcanizate properties, P-allylic initiated polymer

| | 25 | 26 | 27 | 28 | 29 | 30 | 31 | 32 |
|---|---|---|---|---|---|---|---|---|
| | | | | synthetic polymer (sample no.) | | | | |
| | 5 | 6 | 7 | 8 | 5 | 6 | 7 | 8 |
| | | | | compound formulation (Table no.) | | | | |
| | 1a | 1a | 1a | 1a | 1b | 1b | 1b | 1b |
| Bound rubber (%) | 20.1 | 69.4 | 75.5 | 28.0 | 11.7 | 43.5 | 30.1 | 31.7 |
| $ML_{1+4}$ @ 130° C. (final) | 29.1 | 67.4 | 70.0 | 53.0 | 35.2 | 82.1 | 96.0 | 58.9 |
| Strain sweep (60° C., 10 Hz, final) | | | | | | | | |
| tan δ | 0.1456 | 0.0825 | 0.0684 | 0.1136 | 0.1903 | 0.1385 | 0.1398 | 0.1159 |
| Δ tan δ | 0.0687 | 0.0226 | 0.0130 | 0.0460 | 0.1084 | 0.0670 | 0.0624 | 0.0369 |

TABLE 3B

Compound and vulcanizate properties, Si-allylic initiated polymer

| | 33 | 34 | 35 | 36 | 37 | 38 | 39 | 40 |
|---|---|---|---|---|---|---|---|---|
| | | | | synthetic polymer (sample no.) | | | | |
| | 16 | 17 | 18 | 19 | 16 | 17 | 18 | 19 |
| | | | | compound formulation (Table no.) | | | | |
| | 1a | 1a | 1a | 1a | 1b | 1b | 1b | 1b |
| Bound rubber (%) | 17.7 | 69.7 | 76.5 | 25.3 | 7.3 | 46.5 | 27.2 | 26.5 |
| $ML_{1+4}$ @ 130° C. (final) | 16.4 | 52.3 | 53.9 | 40.1 | 20.3 | 63.9 | 78.2 | 38.9 |
| Strain sweep (60° C., 10 Hz, final) | | | | | | | | |
| tan δ | 0.1506 | 0.0777 | 0.0652 | 0.1211 | 0.2248 | 0.1487 | 0.1635 | 0.1231 |
| Δ tan δ | 0.1146 | 0.0515 | 0.0374 | 0.0531 | 0.1406 | 0.0674 | 0.0814 | 0.0317 |

TABLE 3C

| Compound and vulcanizate properties, S-allylic initiated polymer | | | | | | | |
|---|---|---|---|---|---|---|---|
| 41 | 42 | 43 | 44 | 45 | 46 | 47 | 48 |
| synthetic polymer (sample no.) | | | | | | | |
| 21 | 22 | 23 | 24 | 21 | 22 | 23 | 24 |
| compound formulation (Table no.) | | | | | | | |
| 1a | 1a | 1a | 1a | 1b | 1b | 1b | 1b |

| | | | | | | | | |
|---|---|---|---|---|---|---|---|---|
| Bound rubber (%) | 17.8 | 66.3 | 71.8 | 22.8 | 11.2 | 45.4 | 26.3 | 31.8 |
| $ML_{1+4}$ @ 130° C. (final) | 20.3 | 53.2 | 55.4 | 44.4 | 20.3 | 53.2 | 55.4 | 44.4 |
| Strain sweep (60° C., 10 Hz, final) | | | | | | | | |
| tan δ | 0.1541 | 0.0790 | 0.0627 | 0.1217 | 0.2067 | 0.1320 | 0.1404 | 0.1074 |
| Δ tan δ | 0.0775 | 0.0250 | 0.0105 | 0.0541 | 0.1291 | 0.0595 | 0.0668 | 0.0281 |

That which is claimed is:

1. A process for providing a polymer that comprises ethylenic unsaturation, comprising:
   a) providing an initiating compound having the general formula

where M is a Group 1 metal and Q is a functional group that is free of active hydrogen atoms and that is bonded to the allylic C atom of the allyl anion through a atom;
   b) introducing said initiating compound to a reaction vessel that comprises one or more organic liquids and one or more ethylenically unsaturated compounds which comprise at least one polyene;
   c) allowing said one or more ethylenically unsaturated compounds to polymerize, thereby providing said polymer; and
   d) optionally, while said polymer is in carbanionic form, allowing it to react with a terminating compound, coupling agent or linking agent so as to provide terminal functionality to said polymer.

2. The process of claim 1 wherein Q is a $R^1S$ group where $R^1$ is a hydrocarbyl group that is free of ethylenic unsaturation and active H atoms.

3. The process of claim 2 wherein $R^1$ is a $C_1$-$C_6$ alkyl group.

4. The process of claim 1 wherein said at least one polyene comprises one or more conjugated dienes.

5. The process of claim 4 wherein said one or more ethylenically unsaturated compounds further comprises at least one vinyl aromatic compound.

6. The process of claim 1 wherein said one or more organic liquids comprise at least one $C_5$-$C_{12}$ acyclic alkane.

7. The process of claim 6 wherein said one or more organic liquids is at least one $C_5$-$C_{12}$ acyclic alkane.

8. The process of claim 1 further comprising (e) recovering and isolating said polymer and (f) blending said polymer with ingredients that comprise at least one particulate filler so as to provide a rubber compound.

9. The process of claim 8 further comprising vulcanizing said rubber compound so as to provide a vulcanizate, said vulcanizate optionally being a tire component.

10. A process for providing a polymer that comprises ethylenic unsaturation, comprising:
    a) providing an initiating compound having the general formula

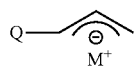

where M is a Group 1 metal and Q is a functional group that is free of active hydrogen atoms and that is bonded to the allylic C atom of the allyl anion through a P atom;
    b) introducing said initiating compound to a reaction vessel that comprises one or more organic liquids and one or more ethylenically unsaturated compounds which comprise at least one polyene;
    c) allowing said one or more ethylenically unsaturated compounds to polymerize, thereby providing said polymer; and
    d) optionally, while said polymer is in carbanionic form, allowing it to react with a terminating compound, coupling agent or linking agent so as to provide terminal functionality to said polymer.

11. The process of claim 10 wherein Q is a $R^1_2P$ group where each $R^1$ independently is a hydrocarbyl group that is free of ethylenic unsaturation and active H atoms.

12. The process of claim 11 wherein each $R^1$ independently is an aryl group.

13. The process of claim 10 wherein said at least one polyene comprises one or more conjugated dienes.

14. The process of claim 13 wherein said one or more ethylenically unsaturated compounds further comprises at least one vinyl aromatic compound.

15. The process of claim 10 wherein said one or more organic liquids comprise at least one $C_5$-$C_{12}$ acyclic alkane.

16. The process of claim 15 wherein said one or more organic liquids is at least one $C_5$-$C_{12}$ acyclic alkane.

17. The process of claim 10 further comprising (e) recovering and isolating said polymer and (f) blending said polymer with ingredients that comprise at least one particulate filler so as to provide a rubber compound.

18. The process of claim 17 further comprising vulcanizing said rubber compound so as to provide a vulcanizate, said vulcanizate optionally being a tire component.

19. A process for providing a polymer that comprises ethylenic unsaturation, comprising:
    a) providing an initiating compound having the general formula

where M is a Group 1 metal and Q is a functional group that is free of active hydrogen atoms and that is bonded to the allylic C atom of the allyl anion through a Sn atom;
   b) introducing said initiating compound to a reaction vessel that comprises one or more organic liquids and one or more ethylenically unsaturated compounds which comprise at least one polyene;
   c) allowing said one or more ethylenically unsaturated compounds to polymerize, thereby providing said polymer; and
   d) optionally, while said polymer is in carbanionic form, allowing it to react with a terminating compound, coupling agent or linking agent so as to provide terminal functionality to said polymer.

20. The process of claim 19 wherein Q is a $R^1{}_3Sn$ group where each $R^1$ independently is a hydrocarbyl group that is free of ethylenic unsaturation and active H atoms.

21. The process of claim 20 wherein each $R^1$ independently is a $C_1$-$C_6$ alkyl group.

22. The process of claim 19 wherein said at least one polyene comprises one or more conjugated dienes.

23. The process of claim 22 wherein said one or more ethylenically unsaturated compounds further comprises at least one vinyl aromatic compound.

24. The process of claim 19 wherein said one or more organic liquids comprise at least one $C_5$-$C_{12}$ acyclic alkane.

25. The process of claim 24 wherein said one or more organic liquids is at least one $C_5$-$C_{12}$ acyclic alkane.

26. The process of claim 19 further comprising (e) recovering and isolating said polymer and (f) blending said polymer with ingredients that comprise at least one particulate filler so as to provide a rubber compound.

27. The process of claim 26 further comprising vulcanizing said rubber compound so as to provide a vulcanizate, said vulcanizate optionally being a tire component.

* * * * *